(12) United States Patent
Machiraju et al.

(10) Patent No.: US 7,407,908 B2
(45) Date of Patent: Aug. 5, 2008

(54) ECO-FRIENDLY PHOTO-FENTON CATALYST-IMMOBILIZED FE(III) OVER HY-ZEOLITE

(75) Inventors: Subrahmanyam Machiraju, Hyderabad (IN); Durga K. Valluri, Hyderabad (IN); Mohammed Noorjahan, Hyderabad (IN)

(73) Assignee: Council of Scientific and Industrial Research (IN)

( * ) Notice: Subject to any disclaimer, the term of this patent is extended or adjusted under 35 U.S.C. 154(b) by 421 days.

(21) Appl. No.: 11/022,276

(22) Filed: Dec. 23, 2004

(65) Prior Publication Data

US 2006/0138057 A1 Jun. 29, 2006

(51) Int. Cl.
*B01J 29/72* (2006.01)
(52) U.S. Cl. .................................... 502/74
(58) Field of Classification Search .................. 502/74
See application file for complete search history.

(56) References Cited

U.S. PATENT DOCUMENTS 4,443,552 A * 4/1984 Iida et al. .................. 502/66
7,259,121 B2 * 8/2007 Schwefer et al. .............. 502/74

OTHER PUBLICATIONS

Corona et al, "Zeolite—based Photocatalysts", Chemical Communications, (May 2004).*
Bossmann et al, "Degradation of polyvinyl alcohol (PVA) by homogeneous and heterogeneous photocatalysis applied to photchemically enhanced Fenton reation", Water Sci. Technol., (2004) (no month avail.).*
Doocey et al, "Zeolite-mediated Advanced Oxidation of Model Chloride Phenolic Aqueous Waste Part 2: Solid Phase Catalysis", Process Safety and Environmental Protection, (Sep. 2004).*
Chan, K.H., et al., "Modeling the reaction kinetics of Fenton's process on the removal of atrazine", Chemosphere, 2003, vol. 51, pp. 305-311.
Sun, Yunfu, et al., "Photochemical Reactions Involved in the Total Mineralization of 2,4-D by $Fe^{3+}/H_2O_2/UV$", Environ. Sci. Technol., 1993, vol. 27, pp. 304-310.
Feng, Jiyun, et al., "Novel Bentonite Clay-Based Fe-Nanocomposite as a Heterogeneous Catalyst for Photo-Fenton Discoloration and Mineralization of Orange II", Environ. Sci. Technol., 2004, vol. 38, pp. 269-275.
Bozzi, Anna, et al., "Superior biodegradability mediated by immobilized Fe-fabrics of waste waters compared to Fenton homogeneous reactions", Applied Catalysis B: Environmental, 2003, vol. 42, pp. 289-303.
Yuranova, T., et al., "Fenton immobilized photo-assisted catalysis through a Fe/C structured fabric", Applied Catalysis B: Environmental, 2004, vol. 49, pp. 39-50.
Li, Jing, et al., "Oxidative degradation of organic pollutants utilizing molecular oxygen and visible light over a supported catalyst of $Fe(bpy)3^{2+}$ in water" Applied Catalysis B: Environmental, 2004, vol. 48, pp. 17-24.
Durgakumari, V., et al., "An easy and efficient use of $TiO_2$ supported HZSM-5 and $TiO_2$ + HZSM-5 zeolite combinate in the photodegradation of aqueous phenol and *p*-chlorophenol", Applied Catalysis A: General, 2002, vol. 234, pp. 155-165.
Noorjahan, M., et al., "A novel and efficient photocatalyst: $TiO_2$-HZSM- combinate thin film", Applied Catalysis B: Environmental, 2004, vol. 47, pp. 209-213.

* cited by examiner

*Primary Examiner*—David M Brunsman
(74) *Attorney, Agent, or Firm*—Darby & Darby

(57) ABSTRACT

This invention presents preparation, characterization and evaluation of an efficient heterogeneous Fe (III)-HY catalyst for photo-assisted Fenton reaction. Fe (III) ions are immobilized on HY zeolite using different loadings by impregnation, calcination and the activity of the catalyst is evaluated by the degradation of phenol. The effect of Fe loadings, $H_2O_2$ concentration, pH and quenching on photo-Fenton reaction are studied. The results obtained clearly show that Fe (III)-HY is efficient in the degradation of phenol and it is compared with that of a homogeneous photo-Fenton reaction. The increased rate of reaction on Fe (III)-HY highlights the synergistic role of zeolite. Heterogeneous Fe (III)-HY in photo-Fenton reaction allows a wide range of pH for reaction against the narrow pH range in homogeneous system. The system is further subjected to evaluate its stability in solid state. The stability of the catalyst is further established by recycling studies.

8 Claims, 4 Drawing Sheets

ECO-FRIENDLY PHOTO-FENTON CATALYST-IMMOBILIZED FE(III) OVER HY-ZEOLITE

FIELD OF THE INVENTION

Figure 1:
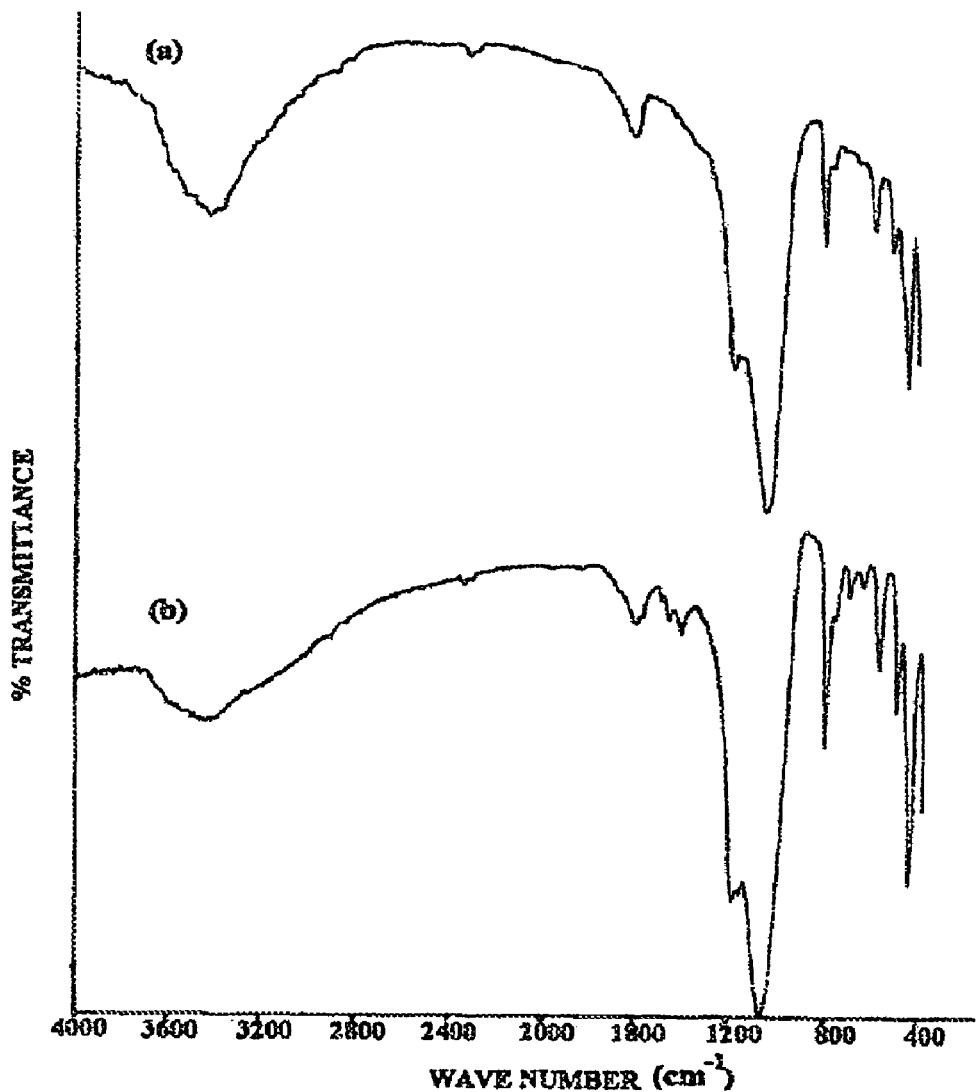

The present invention provides a heterogeneous photo-Fenton system and a method for method for wastewater treatment. Photocatalytic degradation of organic contaminants using photo-Fenton system can become more effective when carried out heterogeneously and is gaining importance in Advanced Oxidation Technologies. More specifically the present invention provides a stable and efficient zeolite based photo-Fenton catalyst.

BACKGROUND OF THE INVENTION

Homogeneous photo-Fenton system is widely studied and reported to be a promising method for wastewater treatment [R. G. Zepp, B. C. Faust, J. Hoigné, Environ. Sci. Technol. 26 (1992) 313-319; K. H. Chan, W. Chu, Chemosphere 51(2003) 305-311; (c) Y. Sun, Joseph J. Pignatello, Environ. Sci. Technol. 27 (1993) 304-310.]. The major disadvantage of such a system is, reactions are to be studied at acidic pH <3 and it is difficult to remove the sludge containing Fe ions after the treatment. The latter step is expensive and not economical. In literature photochemical studies on immobilized Fe ions involved different supports.

Fenton reactions need technically simple equipment and it creates sludge and subsequent disposal problems constitutes the mainly limitations of the process. The pollutants due to metallic salts can be in principle avoided. A good alternative to homogeneous photo-Fenton system can be heterogeneous photocatalysis. The efficacy of the system is compared by measuring the phenol degradation at different experimental conditions to evaluate the dependence of the degree of mineralization. Search engines like Lycos [www.lycos.co.uk], Yahoo [yahoo.co.uk] and Googles [google.com] allow most of the systems to identify photo-Fenton supported areas.

Photochemical studies on immobilized Fe ions involved different supports like silica, nafion membranes, carbon fabric, Clay etc. The immobilization of Fe (III) ions on the cationic exchange resins (Amberlite IRA200) as a photocatalyst for degradation of organic pollutants also being reported [J. Feng, X Hu, Po. L. Yue, Environ. Sci. Technol. 38 (2004) 269-275; A. Bozzi, T. Yuranova, E. Mielczarski, J. Mielczarski, P. A. Buffat, P. Lais, J. Kiwi, Appl. Catal. B 42 (2003) 289-303.; T. Yuranova, O. Enea, E. Mielczarski, J. Mielczarski, P. Albers, J. Kiwi, Appl. Catal. B 49 (2004) 39-50; J. Li, W. Ma, Y. Huang, X. Jao, J. Zhao, Y. Xu, Appl. Catal. B 48 (2004) 17-24]. Thus, a support can be chosen for the immobilization of Fe ions that should resist the oxidative attack during Fenton process without loss in catalytic performance. The present investigation was undertaken to provide practical assessment of photocatalytic treatment of immobilized Fe (III) over HY zeolite to have an eco-friendly photo-Fenton catalyst.

OBJECTIVES OF THE INVENTION

The main objective of the invention is to develop an eco-friendly heterogeneous catalytic system for photo-Fenton reaction It is another objective of the invention to provide the extent of mineralization of the heterogeneous system that should have same extent or more order of magnitude of activity of homogeneous photo-Fenton method.

Another objective of the invention to provide the recycling of catalyst with low cost metal ion usage, no sludge formation etc. which are some of the objectives of the invention for developing heterogeneous photo-Fenton system

SUMMARY OF THE INVENTION

Accordingly, the present invention provides a photo-Fenton catalyst consisting of immobilized Fe(III) on HY-zeolite support.

In one embodiment of the invention, the Fe(III) loading on the zeolite support is in the range of 0.125 wt % to 5 wt %, preferably 0.25 wt %.

The present invention also provides a method for the preparation of a photo-Fenton catalyst consisting of immobilized Fe(III) on HY-zeolite support, the process comprising loading a Fe(III) precursor onto a HY-zeolite support and then calcining the loaded support to obtain a Fe(III) loaded HY-zeolite catalyst.

In one embodiment of the invention, the method comprises wet impregnation wherein a desired weight of inorganic precursor, Fe (III) was dissolved in water and zeolite was added to this solution, soaked for 12 h under continuous stirring, and dried at 100° C., and thereafter calcined at 450° C. for 6 h.

In one embodiment of the invention, the Fe(III) loading on the zeolite support is in the range of 0.125 wt % to 5 wt %, preferably 0.25 wt %.

The present invention also provides a method for the photocatalytic degradation of organic contaminants using a photo-Fenton catalyst consisting of immobilized Fe(III) on HY-zeolite support.

In one embodiment of the invention, the Fe(III) loading on the zeolite support is in the range of 0.125 wt % to 5 wt %, preferably 0.25 wt %.

BRIEF DESCRIPTION OF THE ACCOMPANYING DRAWINGS

FIG. 1 comprises IR spectra of 1 wt. % Fe (III)-HY catalyst (a) before reaction and (b) after irradiation and complexation with o-phen.

Figure 2:
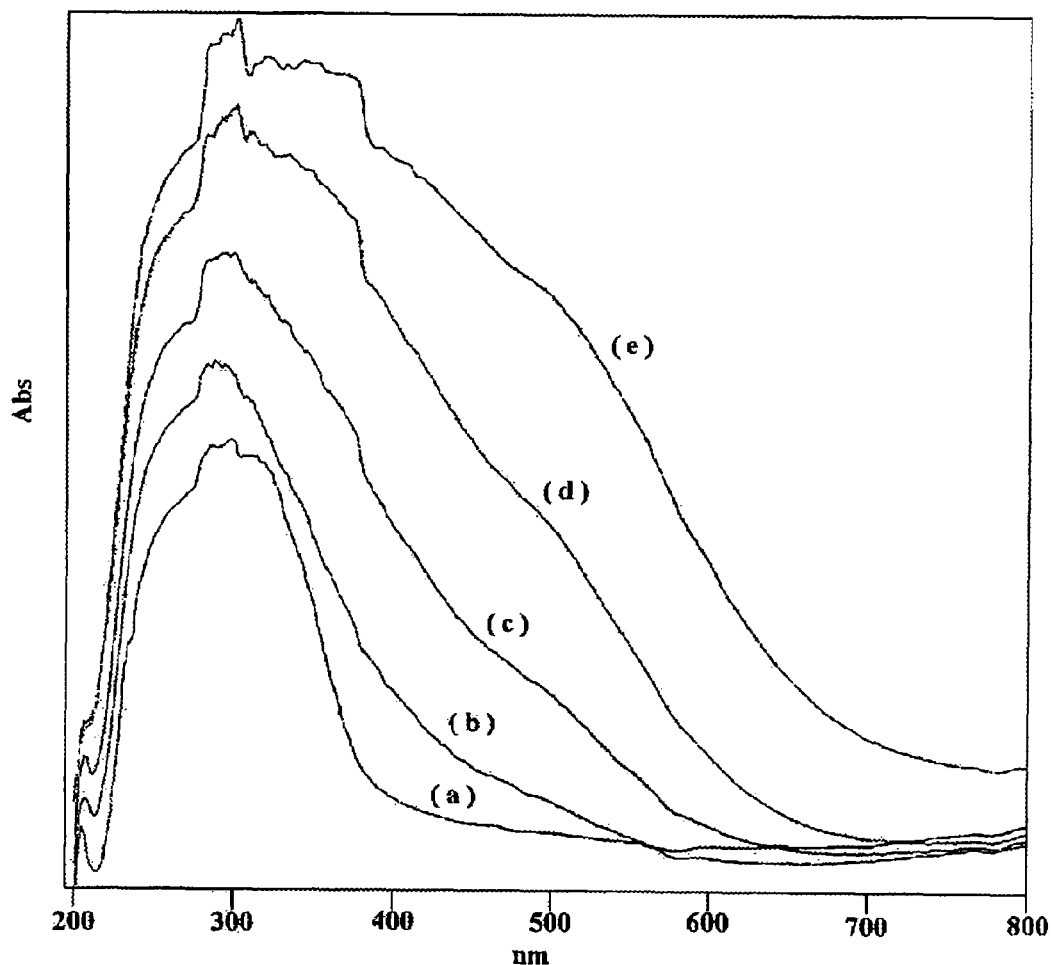

FIG. 2 shows the UV-Vis diffuse reflectance spectra of Fe (III) wt % on HY with
(a)-(b) 0.25 (c) 1 (d) 2 (e) 5 loadings.

Figure 3:
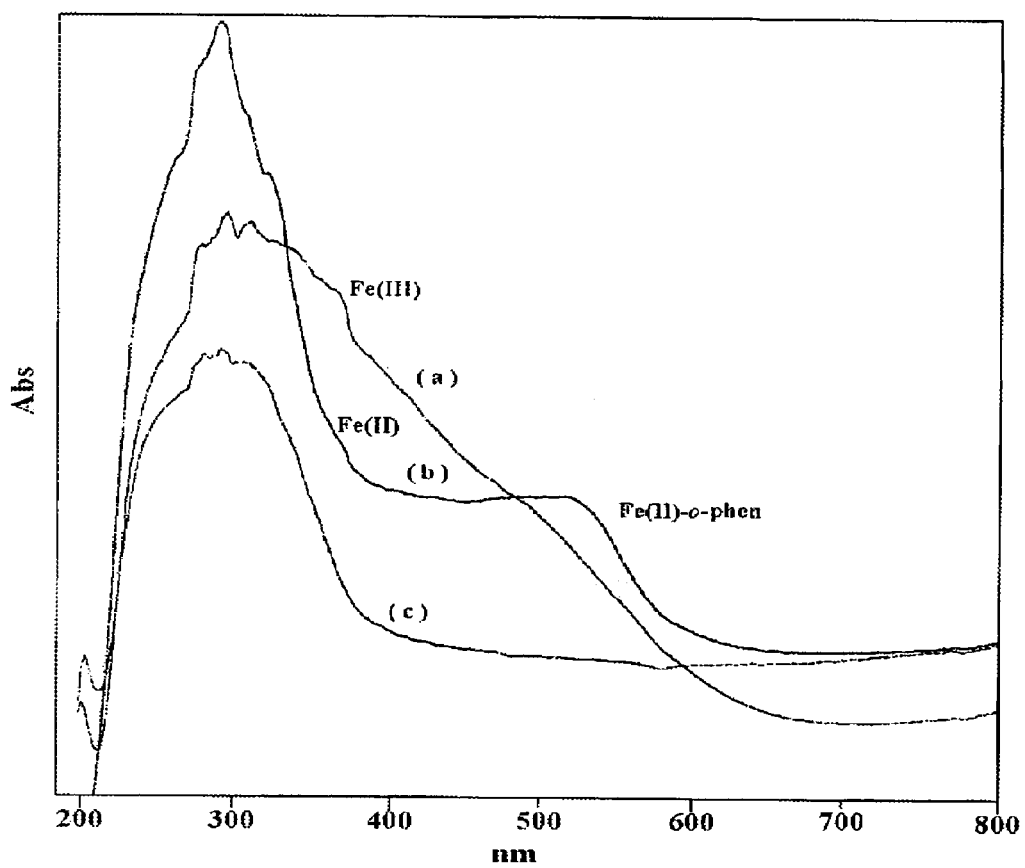

FIG. 3 comprises UV-Vis diffuse reflectance spectra of (a) Fe(Ill)-HY catalyst and (b) Fe(II)-(o-phen)-HY and (c) HY.

Figure 4:
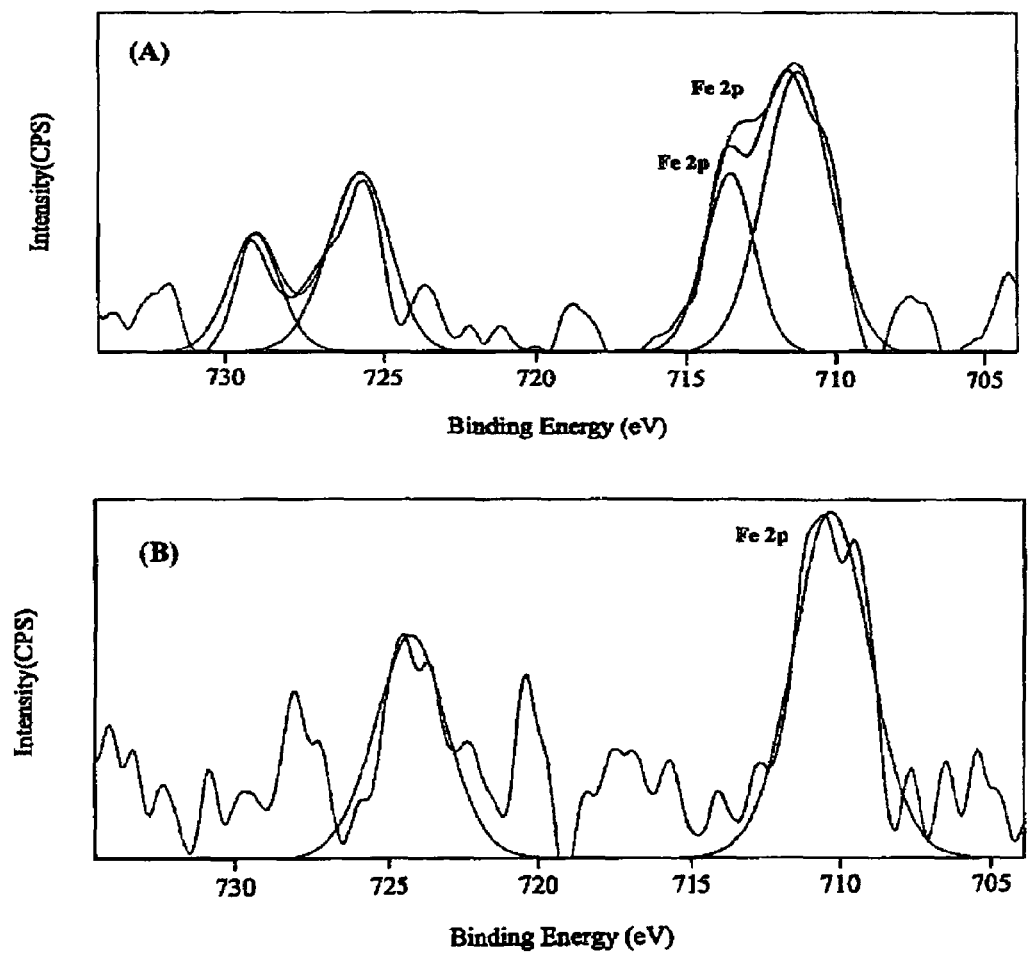

FIG. 4 shows the XPS spectra of the $Fe2p_{3/2}$ and $Fe2p_{1/2}$ regions for 1 wt. % Fe (III)-HY catalysts. The Gaussian-Lorentzian fitting of the experimental curves are also shown (A) Fe(III)-HY and (B) Fe(II)-o-phen-HY.

DETAILED DESCRIPTION OF THE INVENTION

The present invention provides and eco-friendly photo-Fenton reaction in the destruction of pollutants in the industrial effluents.

The aim of the present invention is to prepare a stable heterogeneous photo-Fenton catalyst based on zeolites. The catalyst so prepared was characterized to understand the stability and the red-ox chemistry of iron during the photo-Fenton reaction. The activity of Fe (III)/HY was studied by taking phenol as model compound. Different experimental parameters were studied to arrive at the optimal conditions for this reaction. Further the work also highlights the efficiency of Fe (III)-HY catalyst on recycling.

In continuation of our earlier reports [V. Durga Kumari, M. Subrahmanyam, K. V. Subba Rao, A. Ratna mala, M. Noorjahan, K. Tanaka, Appl. Catal. A 234 (2002) 155-165; M. Noorjahan, V. Durga Kumari, M. Subrahmanyam, P. Boule, Appl. Catal. B 47 (2004) 209-213] the addition of zeolite induces synergism due to the adsorption properties with respect to pollutant molecules and thus facilitates the photo degradation.

The role of zeolite is clear as it not only pools the pollutant molecules to the vicinity of photocatalyst but also stabilizes Fe (III)/Fe (II) ions through interaction in zeolite cavity. The catalyst was characterized to understand the stability and the red-ox chemistry of iron during the photo-Fenton reaction.

The photo-Fenton catalyst was prepared by wet impregnation method. A known weight of inorganic precursor, Fe (III) was dissolved in water and zeolite was added to this solution, soaked for 12 h under continuous stirring, and dried at 100° C. in oven. It was then calcined at 450° C. for 6 h in open air.

The activity of Fe (III)/HY was studied by taking phenol as model compound. Different experimental parameters were studied to arrive at the optimal conditions for this reaction. The Fe (III)-HY catalyst obtained was found to be efficient even on recycling.

The obtained results have clearly indicated that the inherent advantage of using immobilized Fe (III) over HY zeolite for using it in the place of photo-Fenton reaction.

This present invention provides development of an immobilized Fe (III) over HY zeolite for photo-Fenton reaction. More particularly the invention provides a method to provide a practical assessment of heterogeneous photo-Fenton treatment for degradation of organics like phenol containing industrial wastewater and in general pollutants in wastewater. The apparatus of Fenton's reaction needs technically simple equipment. The unit is made with an embodiment adapted for use with sunlight as well as with an in-door light irradiation source. This invention presents preparation, characterization and evaluation of an efficient heterogeneous Fe (III)-HY catalyst for photo-assisted Fenton reaction. Fe (III) ions are immobilized on HY zeolite using different loadings by impregnation, calcination and the activity of the catalyst is evaluated by the degradation of phenol. The effect of Fe loadings, $H_2O_2$ concentration, pH and quenching on photo-Fenton reaction are studied.

The results obtained over Fe (III) ions immobilized over HY zeolite clearly show that Fe (III)-HY is efficient photo-Fenton catalyst in the degradation of phenol and it is compared with that of a homogeneous photo-Fenton reaction. The increased rate of reaction on Fe (III)-HY highlights the synergistic role of zeolite. Heterogeneous Fe (III)-HY in photo-Fenton reaction allows a wide range of pH for reaction against the narrow pH range in homogeneous system. The system is further subjected to evaluate its stability in solid state. The stability of the catalyst is further established by recycling studies.

The invention provides the Fe (III) supported zeolite system in a reactor with an efficient and attractive design for the treatment of pollutants in wastewater systems and its construction offers economic advantages. The supported photocatalyst comprises of Fe (III) supported zeolite system.

To check the catalytic activity of photo-Fenton catalysts, 25 mg of Fe(III)/HY catalyst was taken in 50 ml of phenol ($10^{-4}$ M) solution in a quartz reactor open to air under continuous stirring. The initial pH of the solution was pH ~5.6 and it was not controlled during the process. Prior to start of the light experiments, adsorption properties of Fe(III)-zeolite were studied in dark for 30 min under continuous stirring. For normal photo-Fenton reaction a known volume of $H_2O_2$ is added in order to maintain a desired concentration in solution. The solution was irradiated by UV-light of 250 W mercury vapor lamp for 3 h and samples taken at regular intervals were quenched with methanol to arrest the radical reactions. The samples were filtered and analyzed by HPLC to study the rates of phenol degradation with time.

In order to check the effect of various parameters on the reaction like the presence of light, $H_2O_2$, Fe(III) with and without immobilization have been studied. A preliminary experiment on photolysis (UV light) shows 5-10% degradation of phenol. Whereas in the presence of catalyst and UV light about 25-30% phenol degradation is observed which may be seen as due to the photocatalytic reaction of Fe(III). In the presence of light and $H_2O_2$ the rate of reaction was very fast and reaction was completed in 60 min. This enhanced rate of reaction is due to generation of *OH radicals by the action of Fe(II) formed during the light irradiation (photo-Fenton). In dark with addition of $H_2O_2$ there is no change in the concentration and remained at the same level of adsorption.

In order to compare the heterogeneous photo-Fenton reaction with that of homogenous system we have taken same amount of Fe, which is present on zeolite in phenol solution and homogenous photo-Fenton reaction is studied. The data in table-1 clearly shows that heterogeneous system is faster than the homogenous reaction. This difference in the rate of reaction may be seen as due to the synergistic effect resulting by the adsorption property of zeolite. Wherein adsorbed pollutant molecules are in the immediate vicinity of immobilized Fe-ions are easily attacked by the generated *OH radicals. Thus, heterogeneous photo-Fenton system accounts for the enhanced rate of reaction and is not because of Fe in solution as trace amounts of Fe (II) is detected during the reaction. The heterogeneous photo-Fenton reaction shows degradation of phenol in less irradiation time when compared to homogeneous system at similar reaction conditions.

TABLE 1

Effect of various experimental parameters on photo-Fenton degradation of phenol ($10^{-4}$ M);
(A) - UV + Fe(III)-HY + $H_2O_2$; (B) - homogeneous photo-Fenton;
(C) - UV + Fe(III)-HY; (D) - dark + Fe(III)-HY + $H_2O_2$; (E) - photolysis;

| Time | % phenol | | | | |
|---|---|---|---|---|---|
| (min) | A | B | C | D | E |
| −30 | 100 | 100 | 100 | 100 | 100 |
| 0 | 86.9 | 99 | 85.7 | 86.2 | 100 |
| 30 | 6.2 | 63 | 75.7 | 83.5 | 97.7 |
| 60 | 1.5 | 48 | 74.6 | 80.9 | 93.6 |
| 90 | — | 35 | 72.3 | 79.8 | 92.8 |
| 120 | — | 27 | 69.6 | 78.1 | 91.3 |
| 150 | — | 24 | 64.7 | 78 | 89.8 |
| 180 | — | 20 | — | — | — |

EXAMPLES

Examples 2-9 related to the data obtained over immobilized Fe(III)-HY zeolite photo Fenton catalyst. In various examples the following analytical methods were used.

Materials and Chemicals

Phenol (purity grade>98%) from Merck, Ferric nitrate nona hydrate, $Fe(NO_3)_3 \cdot 9H_2O$ 98% and $H_2O_2$ (30% w/w) were from Qualigens and 1,10-phenanthroline from Fluka were obtained. All solutions were prepared with de-ionized water. HY (Si/Al=5.2) zeolite purchased from PQ (Philadelphia Quartz corporation, USA) is of surface area 500 $m^2g^{-1}$. Fe(III)-HY zeolite a heterogeneous photo-Fenton catalyst was prepared by wet impregnation.

The diffraction patterns of the Fe(III)-HY catalysts were recorded with Siemens D-5000 X-ray diffractometer using Cu K$\alpha$ radiation at a scan rate of $0.09°$ $(2\theta)s^{-1}$. Uv-Vis-Diffuse Reflectance Spectroscopy measurements of solid Fe(III)-HY were performed using pellets of 50 mg catalyst sample ground with 2.5 g of KBr by sphere reflectance accessory. Infrared spectra of the Fe(III)-HY catalysts were recorded on a Nicolet 740 FT-IR Spectrometer using the KBr self supported pellet technique in the frequency range of 400-4000 cm$^{-1}$. The Electron Spectroscopy for Chemical Analysis (ESCA) was carried out on KRATOS AXIS 165 Photoelectron Spectroscopy using the Mg K$\alpha$ (150 W) anode. For energy calibration Carbon Is photoelectron line was used. The location and full width at half maximum for a species was first determined using the spectrum of a pure sample. Symmetric Gaussian shapes were used in all cases for fitting the experimental curves. The binding energies of Fe, O, Si and Al, were measured.

Phenol solutions of concentration ($10^{-4}$ M) were freshly prepared from the stock solution for the Fenton and photo-Fenton experiments. A UV source of 250W mercury vapor lamp of wavelengths greater or equal to 254 nm was used. Prior to the start of light experiments dark adsorption experiments were carried out for 1 h under continuous stirring. In a typical experiment a phenol solution of 50 ml ($10^{-4}$ M) was taken in a quartz photo reactor and 25 mg of catalyst is added and required pH of the solution is maintained by adding HCl or NaOH. Fenton reactions were initiated by addition of known concentration of $H_2O_2$ obtained by diluting 30% w/w $H_2O_2$ prior to the start of experiment and samples of the suspensions were taken at regular intervals and the radical reaction in the samples was quenched with 0.5 ml methanol and then subjected to analysis.

The concentration of phenol was determined by HPLC using C-18 phenomix (5 µm), 250×4 mm column and methanol/water mobile phase of ratio 50/50 v/v % and at flow rate of 1 ml min$^{-1}$. UV absorbance was measured in the range of 190-500 nm. Phenol is normally quantified at $\lambda$=220 nm.

The elemental analyses of Fe on the zeolite catalysts were determined by Atomic Absorption Spectroscopy (AAS) using Perkin Elmer 300 A spectrophotometer. Any formation of Fe(II) during photo-Fenton reaction in solution is estimated by measuring the concentration of Fe(II) using 1,10-phenanthroline (o-phen) by complexometry method. The irradiated samples were taken and quenched with methanol and added to a standard volumetric flask, which contains o-phen solution and acetate buffer and kept in dark for 30 min. Absorbance was measured at the maximal absorption of Fe(II)-o-phen complex i.e., at $\lambda_{max}$=510 nm and $\epsilon_{510}$=10476 M$^{-1}$ cm$^{-1}$ as determined by a calibration curve. Solutions of Fe(II)-o-phen complex were recorded on Cintra $10_e$ spectrophotometer.

Example 1

Effect of Fe(III) Loading on Zeolites were Studied

Table-2 shows the effect of Fe (III) loading on HY in photo-Fenton reaction. It was observed that 0.25 wt. % Fe(III)-HY shows higher efficiency than the catalysts with high loading of Fe. With increase in the iron content the activity does not increase. At low loadings, Fe-ions occupy the available cationic sites in the zeolite and above this concentration the excess Fe may form the Fe-clusters in the cavity and may block the pores openings and hinder the adsorption and entry of pollutant molecules. This clearly shows that one has to optimize the Fe content for the efficient photo-Fenton activity retaining the adsorption properties of the zeolite to enhance the rate of reaction.

TABLE 2

Effect of Fe(III) loading over HY on heterogeneous photo-Fenton degradation of phenol ($10^{-4}$ M); $H_2O_2$ = $10^{-3}$ M; pH = 6

| Time | Phenol Wt. % of Fe(III)-HY | | | | | |
|---|---|---|---|---|---|---|
| (min) | 5 | 2 | 1 | 0.5 | 0.25 | 0.125 |
| −30 | 100 | 100 | 100 | 100 | 100 | 100 |
| 0 | 77.2 | 87.3 | 97.2 | 89 | 86.9 | 96.6 |
| 10 | 51.7 | 53.8 | 50.1 | 37 | 35.6 | 35.6 |
| 20 | 39.5 | 34.8 | 24.3 | 23 | 17.68 | 19.4 |
| 30 | 27.3 | 20.9 | 15.04 | 13 | 6.2 | 8.6 |
| 40 | 19.9 | 12 | 11.5 | 9 | 5.4 | 4.2 |
| 50 | 11.9 | 8 | 6.06 | 3.6 | 3.4 | — |
| 60 | 10.1 | 7.4 | 1.4 | 1.5 | 1.5 | — |

Example 2

In order to check the role of effect of quenching methanol and *OH scavenger is added. In a photo-Fenton reaction on irradiation Fe(III) reduces to Fe(II) and these active species decompose the $H_2O_2$ to form the *OH radical, a reaction similar to a Fenton reaction, which is continuous even in the absence of light. If this radical reaction is not stopped after the sample collection the reaction is continuous even in the sample vial in presence of Fe (II) and $H_2O_2$. In order to arrest this radical reaction a *OH scavenger like methanol is added. Samples collected at regular intervals were quenched with methanol and for comparison another experiment was done without quenching and the results are shown in table-3. Without quenching the rate of reaction appears to be fast and 99% degradation is observed in 30 min. But the real rate of reaction is observed when the solution was quenched with methanol. So in all our experiments the samples were quenched before the analysis in order to avoid the radical reaction.

TABLE 3

Influence of *OH scavenger on photo-Fenton mediated phenol degradation over Fe(III)-HY

| Time | % Phenol | |
|---|---|---|
| (min) | With methanol | Without methanol |
| −30 | 100 | 100 |
| 0 | 88.4 | 90 |
| 10 | 66 | 35.6 |
| 20 | 33.6 | 19.4 |
| 30 | 22.4 | 8.6 |
| 60 | 6.7 | 1.2 |
| 90 | 3.4 | 0 |

Example 3

Tests were Performed on the Effect of pH

The influence of pH on phenol degradation on heterogeneous Fe(III)-HY/UV/$H_2O_2$ was and shown in table-4 The experiments were done at pH=3.0, 6 and 8.0 respectively and the pH was not adjusted during the process. The maximum degradation of phenol is observed within 60 min at pH=3. It was observed that at pH=6 initial rate was slow, and latter it followed the same pattern of pH=3. In case of pH=8, the rate of reaction was very slow and complete conversion of phenol was observed over a period of 3 h. In homogenous systems pH=3-4 is known to be the optimal value for phenol degradation by $H_2O_2$/iron. As the degradation proceeds the formation of organic acids, lead to a drop of pH of the solution. In that case at pH=3, there will be no change in the pH of the solution during the reaction. In case of pH>3 there is decrease of pH during the reaction. At pH=8, precipitation of iron hydroxide and leads to an enhanced rate of $H_2O_2$ decomposition. Thus, the observed rate of reaction at pH=8 is slow as mentioned above. Whereas in the case of heterogeneous Fenton catalysts due to the immobilization of Fe(III) on the surface of zeolite no precipitation of iron is seen even at pH>5. It is known that leaching of Fe out of zeolite or amorphous silica depends on pH. [V. Durga Kumari, M. Subrahmanyam, K. V. Subba Rao, A. Ratna Mala, M. Noorjahan, K. Tanaka, Appl. Catal. A 234 (2002) 155-165; M. Noorjahan, V. Durga Kumari, M. Subrahmanyam, P. Boule, Appl. Catal. B 47 (2004) 209-213].

Though the activity is high at pH=3 to avoid the leaching of iron, the experiments in the present study are conveniently carried out at pH>5 where no leaching of Fe is observed.

TABLE 4

Influence of pH on the percentage removal of phenol over Fe(III)-HY during photo-Fenton reaction

| Time (min) | % phenol | | |
|---|---|---|---|
| | pH = 3 | pH = 6 | pH = 8 |
| −30 | 100 | 100 | 100 |
| 0 | 86 | 86.9 | 100 |
| 10 | 55.2 | 35.6 | 94.1 |
| 15 | 27 | 21.7 | 88 |
| 20 | 17.6 | 17.8 | 83.9 |
| 30 | 12.4 | 6.2 | 79 |
| 40 | 6.2 | 5.4 | 69.4 |
| 60 | — | 1.5 | 59.8 |
| 120 | — | — | 14.3 |
| 180 | — | — | 2.1 |

Example 4

The effect of $H_2O_2$ Concentration on Photo-Fenton Assisted Reaction is Carried Out The degradation of phenol over 0.25 wt % Fe(III)-HY at pH=6 with different hydrogen peroxide concentrations were studied and it is shown in table-5. It was observed that with increase in $H_2O_2$ concentration from $10^{-4}$ M to $10^{-3}$ M the percent removal of phenol increases due to increased *OH radicals in solution. Further increase in the concentration of $H_2O_2$ to $10^{-2}$ M, decreased the phenol degradation. This may be seen as due to the reaction of generated *OH radicals with $H_2O_2$ to form hydroperoxyl radicals, which are less reactive than *OH radicals and thus not suitable for degradation of pollutants in solution.

TABLE 5

Effect of hydrogen peroxide concentration on photo-Fenton assisted degradation of phenol ($10^{-4}$ M) over Fe(III)-HY catalyst at pH = 6.

| Time (min) | % of Phenol $H_2O_2$ concentration | | |
|---|---|---|---|
| | $10^{-3}$ M | $10^{-2}$ M | $5 \times 10^{-4}$ M |
| −30 | 100 | 100 | 100 |
| 0 | 86.9 | 91.6 | 90 |
| 30 | 6.2 | 50 | 68 |
| 60 | 1.5 | 31 | 38 |
| 90 | — | 18 | 30 |
| 120 | — | 14 | 22 |
| 150 | — | 11 | 15 |
| 180 | — | 10 | 8 |
| 210 | — | — | 6 |

Example 5

Experiments were Also Performed on Catalysts Recycling Studies

Table-6 shows the the stability of the Fe(III)-HY catalyst. Recycling studies were done on 0.25 wt. % Fe(III)-HY for three cycles with the same concentration of catalyst at similar experimental conditions. It is observed that the initial rate is same and latter there is a decrease in the rate of degradation, when the catalyst is reused without calcination which may be because of accumulation of organic intermediates in the zeolite cavities, which slow down the activity. The catalyst, regenerated and reused, shows the same extent of activity as the original one.

TABLE 6

The percentage degradation of phenol over 0.25 wt. % Fe(III)-HY on recycling studies

| Time (min) | % phenol | | |
|---|---|---|---|
| | I cycle | III cycle (calcined) | III cycle (uncalcined) |
| −30 | 100 | 100 | 100 |
| 0 | 86.9 | 86.2 | 90 |
| 15 | 21.7 | 22.6 | 29 |
| 30 | 6.2 | 7.8 | 14 |
| 60 | 1.5 | 1.4 | 2 |

Example 6

Chemical Analysis of the Catalysts After the Reactions are Performed

To check the loss of iron from zeolite during the degradation reaction, the catalyst after use was digested in aquaregia and analyzed by AAS for the Fe content. It was observed that the amount was nearly equal to original Fe content of zeolite and there is a minimum amount of 0.1 to 4.0 ppm of Fe content in solution after the reaction. In order to check whether the Fe(II) ions are coming into the solutions during the reaction on irradiation. 1,10-phenanthroline is taken in buffer solution and irradiated samples were added to form a Fe(II)-o-phen complex which can be measured calorimetrically at $\lambda_{max}$=510 nm. The absorbance of the solution is observed which corresponds to a Fe(II) concentration of 0.3 ppm calculated from calibration graph.

Example 7

IR-Characterization of Fe(III)-HY Before and During the Course of Reaction

As per this structure the IR spectra of Fe(III)-HY shown in FIG. 1a, should exhibit characteristic peaks at 895 cm$^{-1}$ Fe—O—Fe asymmetric stretch and Fe—O at 606 cm$^{-1}$ These characteristic bands are not clearly seen as they overlap with zeolite characteristic stretching frequencies, which are predominant in this region. However the stretching frequencies of zeolite in this region are intensified due to presence of Fe—O—Fe and Fe—O stretching frequencies in the Fe(III)-HY catalyst. The Fe(III)-HY catalyst is irradiated by photon to form Fe(II)-HY and is complexed with o-phenanthroline. The solid obtained out of this experiment was dried and characterized by IR spectra to confirm the formation of Fe(II) in the solid state. The characteristic peaks of [Fe(phen)]$^{2+}$ that range from 400-1600 cm$^{-1}$ and Fe—O—Fe stretching frequency shift to 841 cm$^{-1}$ are not observed on the surface due to overlap with zeolite stretchings in this region. Whereas in the 1400-1600 cm$^{-1}$ less intense peaks of o-phenanthroline in Fe(II)-o-phen complex are seen (FIG. 1b). The broad OH frequency in Fe (III)-HY in turn found to be decreased and this may be seen as due to the lone pair of electrons of nitrogen atom in o-phenantholine interacting with the surface silanols through hydrogen bonding. Thus IR studies clearly show that Fe(III)-HY on irradiation with a photon is converted into Fe(II)-HY that would be complexed with o-phen in solid state.

Example 8

UV-Vis diffuse reflectance absorption spectra of Fe(III)-HY show wide range of characteristic Fe—O charge transfer bands of $Fe_2O_3$ in the range of 380-570 nm (FIG. 2). At low percentages of Fe the band edge is blue shifted lying very close to band edge of zeolite that may be seen as due to interaction Fe(III) with the zeolite. As the percentage of Fe(III) on zeolite increases the band edge is shifted towards 500-570 nm, which may be accounted for the agglomeration of iron oxide particles on the surface of the zeolite. On the other hand, FIG. 3 shows the DRS spectra of Fe(III)-HY on irradiation and complexation with o-phen. On irradiation, the band edge of Fe(III)/HY is blue shifted which may be seen as due to reduction of Fe(III) to colorless Fe(II). The DRS of complexed Fe(II)-HY catalyst shows a new broad absorption band at 520-530 nm which is characteristic band of [Fe(o-phen)]$^{2+}$ complex.

Example 9

The reduction of Fe (III) to Fe (II) during photo-Fenton reaction is also characterized by ESCA. Fe (III)-HY after irradiation in solution and is complexed with 1,10-phenanthroline under the specified conditions as given in the experimental to stabilize the Fe (II) oxidation state and these samples were subjected to ESCA studies as shown in FIG. 4 and Table 7. It is observed that the binding energy (B.E) of the $Fe_{2p}$ doublet slightly shifted to lower B.E value after the irradiation, which may be seen as due to the transformation of Fe (III) to Fe (II).

TABLE 7

XPS results of Fe(III)-HY catalyst showing binding energies of various elements before and after irradiation

| Spectral peaks | BE's (eV) Before irradiation | BE's (eV) After irradiation |
|---|---|---|
| Fe(2p) | 711.3, 713.5 | 710.3 |
| O(1s) | 532.7 | 531.9 |
| Si(2p) | 103.6 | 102.8 |
| Al(2p) | 75.4 | 74.25 |

ADVANTAGES OF THE INVENTION

The easy and simple preparation of Fe (III)-HY catalysts by impregnation and calcinations for photo-Fenton reaction The activity of immobilized Fe (III)-HY is evaluated by studying the phenol degradation.

The different reaction parameters like effect of loading of Fe (III), pH, $H_2O_2$ concentration and quenching are optimized and they are useful to extend this for wastewater treatment Low metal containing Fe (III)-HY shows high activity for degradation of phenol at pH=6.

Heterogeneous Fe (III)—HY is proved for efficiency over homogenous photo-Fenton system which may be applied even at pH>5.

The synergistic effect of zeolite by adsorption of pollutant molecules facilitating enhanced rate of degradation.

The red-ox states of Fe in solid state confirmed by IR, DRS and XPS helps the sustainability of the process.

The present work opens an eco-friendly method by heterogenizing the homogenous photo-Fenton system as a stable and efficient photo-Fenton catalyst for wastewater treatment.

We claim:

1. A photo-Fenton catalyst consisting of immobilized Fe(III) on HY-zeolite support, wherein the Fe(III) occupies cationic sites in the support.

2. The catalyst of claim 1, wherein the Fe(III) loading on the zeolite support is in the range of 0.125 wt % to 5 wt %.

3. The catalyst of claim 1, wherein the Fe(III) loading on the zeolite support is 0.25 wt %.

4. A method for the preparation of a photo-Fenton catalyst consisting of immobilized Fe(III) on HY-zeolite support, the process comprising loading a Fe(III) precursor onto a HY-zeolite support and then calcining the loaded support to obtain a Fe(III) loaded HY-zeolite catalyst, wherein the Fe(III) on HY-zeolite support occupies cationic sites in the HY-zeolite support.

5. The method of claim 4, wherein the method comprises wet impregnation wherein a desired weight of inorganic precursor, Fe(III) was dissolved in water and zeolite was added to this solution, soaked for 12 h under continuous stirring, and dried at 100° C., and thereafter calcined at 450° C. for 6 h.

6. The method of claim 5, wherein the Fe(III) precursor is $Fe(NO_3)_3$ $9H_2O$.

7. The method of claim 4, wherein the Fe(III) loading on the zeolite support is in the range of 0.125 wt % to 5 wt %.

8. The method of claim 4, wherein the Fe(III) loading on the zeolite support is 0.25 wt %.

* * * * *